3,803,177
PROCESS FOR PRODUCTION OF ERIODICTYOL
Vijay K. Jain, Hightstown, N.J., assignor to
Cooper Laboratories, Inc.
No Drawing. Filed Jan. 24, 1973, Ser. No. 326,499
Int. Cl. C07d 7/34
U.S. Cl. 260—345.2                                     5 Claims

ABSTRACT OF THE DISCLOSURE

Eriodictyol is produced by reacting hesperetin with a demethylating amount of aluminum chloride utilizing pyridine as the reaction solvent.

---

This invention relates to a process for the preparation of eriodictyol, and more particularly to a process for producing eriodictyol through the demethylation of hesperetin. Eriodictyol is a flavanoid having the structure 5,7,3',4'-tetrahydroxyflavanone and, in its glycoside form, is a natural constituent of plant materials, particularly the lemon. It is a component of the group of related flavanoid substances collectively designated as Vitamin P and in experimental work has been found to be pharmacologically effective in the maintenance of normal conditions in the walls of the small bleed vessels. In addition, it may be used, as suggested in U.S. Pat. 2,857,318, in the preparation of azo dyes and woodstains. Various methods have been advanced in the past for the isolation and synthesis of eriodictyol but none of these have been of practical significance since the procedures are cumbersome and the yields are low thus making their synthesis uneconomical for possible clinical use. In addition, eriodictyol has been produced by demethylation of flavanodis utilizing hydroiodic acid or aluminum chloride as demethylating agents, but in these cases the reaction solution included solvents such as acetic acid or benzene and in each case the processes were characterized by either low yields or undesirable side products.

SUMMARY OF THE INVENTION

It has now been discovered that eriodictyol may be produced from hesperetin in high yield and purity by reacting the hesperetin with a demethylating amount of aluminum chloride utilizing pyridine alone as the reaction solvent.

Accordingly, it is an object of this invention to provide a process for synthesizing eriodictyol through the demethylation of hesperetin.

It is a further object of this invention to produce eriodictyol from hesperetin in high yield and purity.

It is still further an object of this invention to provide a process for demethylating hesperetin with aluminum chloride which avoids the production of unwanted side products.

DETAILED DESCRIPTION OF THE PREFERRED EMBODIMENTS

The starting material utilized in the present invention is hesperetin, a compound which is commercially available as such or, in its glycoside form, occurs in nature in many citrus fruits such as lemons, oranges, etc. According to this invention, a selected quantity of hesperetin may be demethylated to eriodictyol by contacting it with a demethylating amount of aluminum chloride utilizing pyridine as the reaction solvent. In general, the reactants will be present in a molar ratio of one mole of hesperetin to five moles of aluminum chloride. The demethylating process can be carried out at various temperatures between 25–95° C. at atmospheric pressure but the preferred temperature is between about 60–80° C. If the reaction is conducted under reflux at temperatures greater than indicated above, many undesirable by-products will be formed. The critical feature of this invention is the use of pyridine as the reaction solvent, but the amount of pyridine used is not critical itself. It is only necessary to add a sufficient amount to provide a stirrable mixture. Too little pyridine makes stirring difficult whereas too much slows down the reaction. It has been found that about 60 ml. of pyridine per 5 gr. of hesperetin will provide an acceptable mixture. In general, the reaction time will be between 4–12 hours.

The following example will further illustrate the invention:

Example

Fifty grams (160 mmoles) of hesperetin was dissolved in a three-neck 2 liter flask containing 1000 ml. of anhydrous pyridine. As the solution was stirred mechanically, 133 grams of aluminum chloride was added to it during a period of one hour. The reaction was exothermic and the temperature rose to 70° C. After the addition of the aluminum chloride, the reaction mixture was stirred at room temperature overnight.

The pyridine was removed from the reaction mixture in vacuo at 15 mm. at 45° C. leaving a red colored residue. This residue was dissolved in 1800 ml. of 10% hydrochloric acid. The aqueous solution was cooled in an ice bath throughout the hydrolyzing period. The acidic solution was then extracted with ethyl acetate (2× 750 ml., 250 ml.). The combined extract was washed with distilled water (2× 250 ml.) and then dried over anhydrous sodium sulfate. After removing the ethyl acetate in vacuo, the residue was dried in vacuo at 108° C., and gave 44.9 grams of crude eriodictyol, M.P. 265–266° C. dec.

The crude eriodictyol was dissolved in 1250 ml. of refluxing 50% ethanol. Thereafter, the hot solution was filtered and then allowed to crystallize overnight at room temperature. The crystalline product was filtered and dried in vacuo at 90° C. for three hours. In this manner, 23.0 grams of pure eriodictyol, M.P. 269–270° dec. was obtained. A second crop of 16.9 grams of eriodictyol, M.P. 265–267° C. dec., was collected from the filtrate by diluting it with water. The total recovery of eriodictyol, therefore, was 39.9 grams—constituting a yield of 80.5%, based on the 50 grams of hesperetin used as starting material.

The crude eriodictyol was subjected to further purification by the following procedure. The crude eriodictyol (91.2 grams) was dissolved in 1500 ml. of refluxing alcohol (95%) and then filtered. The filtrate was diluted with 3250 ml. of water. Crystallization of eriodictyol proceeded overnight at 4° C. The final product was collected and dried as usual, yielding 73.6 grams (87% of theory) of eriodictyol, M.P. 270–272° C.

The invention may be embodied in other specific forms without departing from the spirit or the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:
1. A process for producing eriodictyol which comprises reacting hesperetin with a demethylating amount of aluminum chloride in pyridine.
2. A process as defined in claim 1 wherein said reaction is conducted at a temperature within the range 25–29° C.
3. A process as defined in claim 1 wherein the molar ratio of hesperetin to aluminum chloride is 1 to 5.

4. A process for producing eriodictyol which comprises:
dissolving hesperetin and aluminum chloride in pyridine in a molar ratio of 1 mole of hesperetin to 5 moles of aluminum chloride,
reacting said dissolved hesperetin and aluminum chloride for a period of between 4–12 hours at a temperature between 60–80° C., and
recovering eriodictyol from said solution.

5. A process as defined in claim 4 wherein the reaction solution comprises about 60 ml. of pyridine per 5 grams of hesperetin.

References Cited
UNITED STATES PATENTS
3,549,661  12/1970  Masquelier et al. ___ 260—345.2

JOHN M. FORD, Primary Examiner

UNITED STATES PATENT OFFICE
CERTIFICATE OF CORRECTION

Patent No. 3,803,177          Dated    April 9, 1974

Inventor(s)  Vijay K. Jain

It is certified that error appears in the above-identified patent and that said Letters Patent are hereby corrected as shown below:

Column 1, line 26, delete "bleed" and substitute --blood--.

Column 2, line 52, after "of" insert --pure--.

Column 2, line 68 delete "29°C" and insert --95°C--

Signed and sealed this 10th day of September 1974.

(SEAL)
Attest:

McCOY M. GIBSON, JR.          C. MARSHALL DANN
Attesting Officer             Commissioner of Patents